March 4, 1924.
V. V. TORBENSEN
AXLE HOUSING AND METHOD OF MAKING THE SAME
Filed Dec. 8, 1922
1,485,443
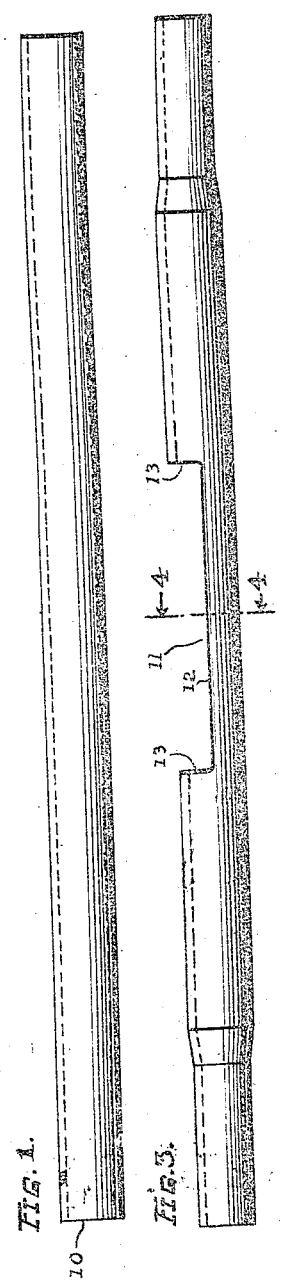
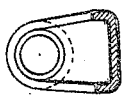
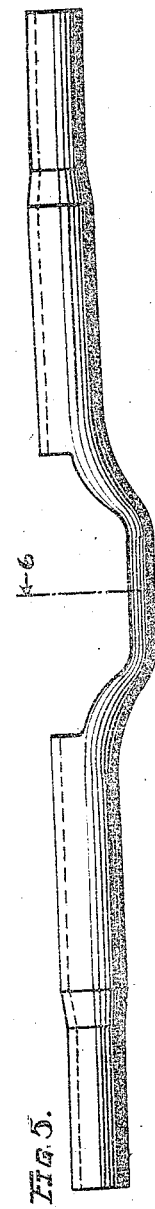
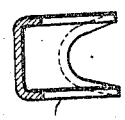
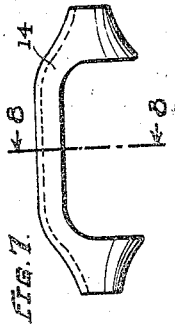
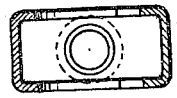
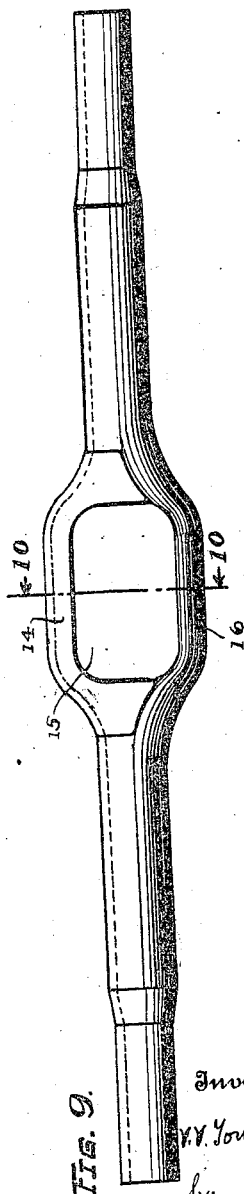
Inventor
V. V. Torbensen
by
Attorney Patented Mar. 4, 1924.

1,485,443

UNITED STATES PATENT OFFICE.

VIGGO V. TORBENSEN, OF CLEVELAND, OHIO, ASSIGNOR TO THE VIG-TOR AXLE COMPANY, OF CLEVELAND, OHIO, A CORPORATION OF OHIO.

AXLE HOUSING AND METHOD OF MAKING THE SAME.

Application filed December 8, 1922. Serial No. 605,587.

*To all whom it may concern:*

Be it known that I, VIGGO V. TORBENSEN, a citizen of the United States, and a resident of Cleveland, county of Cuyahoga, State of Ohio, have invented certain new and useful Improvements in Axle Housings and Methods of Making the Same, of which the following is a specification.

This invention relates to axle housings for motor vehicles and the method of making the same.

One of the objects of the invention is to provide an axle housing of simple and rugged construction from material adapted to withstand the service to which the axle is subjected and which may be manufactured at a reasonable cost.

A further object of the invention is to provide a method of manufacturing an axle housing from rolled steel by equipment which may be provided at a reasonable cost.

A further object of the invention is to provide an axle construction in which all of the parts are so designed as to be subjected only to the classes of stresses that they are adapted to withstand.

Other objects of the invention and the features of novelty will be apparent from the following description taken in connection with the accompanying drawings, of which:

Figure 1 is a side elevation of a length of tube from which an axle is formed, according to my method;

Fig. 2 is an end elevation of the same;

Fig. 3 is a view of the tube shown in Fig. 1 after the first and second operations in which the ends of the tube are swaged to size and a semi-circular section is cut from the middle portion of the tube;

Fig. 4 is a transverse section on the line 4—4 of Fig. 3;

Fig. 5 is a view similar to Fig. 3 but showing the axle after the third operation, in which the middle portion is shaped to form one half of the enlarged middle part of the housing;

Fig. 6 is a transverse section on the line 6—6 of Fig. 5;

Fig. 7 is a side elevation of a formed piece to be inserted at the middle of the housing to complete the enlarged middle part of the housing;

Fig. 8 is a transverse section on the line 8—8 of Fig. 7;

Fig. 9 is a side elevation of the completed housing; and

Fig. 10 is a transverse section on the line 10—10 of Fig. 9.

Referring to the drawings, 10 indicates a length of straight, cylindrical and preferably seamless tube, of the proper steel for withstanding the stress to which an axle housing is subjected. While I have illustrated a housing made of cylindrical tubing it is to be understood that square tubing or tubing of other cross-section may be used in practicing my invention. By the first operation, which may be performed on a punch press or a milling machine or in any other suitable manner, a semi-circular section is cut from the middle portion of the tube, as indicated at 11, thereby providing the longitudinal edges 12 and the semi-circular transverse edges 13. If the cut away portion is removed in a punch press it will probably be advisable to insert a suitably formed mandrel within the tube to support the metal during the shearing operation.

By the second operation, the ends of the tube are swaged in an ordinary swaging machine to reduce their diameter to that desired to form the wheel journals. By the third operation the middle portion of the housing is bent, in suitable dies, to substantially the form shown in Figs. 5 and 6, to provide one half of the enlarged central portion of the housing in which the usual differential gearing is located.

The arched piece 14, shown in Figs. 7 and 8, is formed on stamping presses from flat sheet steel and is fitted into the opening at the middle portion of the housing, as indicated in Fig. 9 and the abutting edges are welded or brazed, as may be preferred, to secure the piece in position. As shown in Figs. 9 and 10, the axle housing thus formed has openings 15 on the front and rear sides and these sides are substantially flat so as to be adapted to receive suitable cover plates or other parts of the axle. The matter of finishing the housing from the stage illustrated in Figs. 9 and 10 forms no part of the present invention, and a description of the additional operations is, therefore, omitted, as the housing illustrated in these figures is a completed article ready for the machining operations.

The part 16 at the middle of the housing, being integral with the tubular end portions is preferably employed as the bottom of the axle, being fully capable of transmitting the tension stresses to which this part of the housing is subjected in service. On the other hand, the piece 14 will be in compression and the welded joints will not be subjected to pulling stresses, which are the stresses they are least capable of withstanding. A housing made as above described has numerous advantages over pressed steel housings as now made in which two halves are welded together by longitudinal seams, and at the same time is a commercially feasible proposition on account of the low cost of manufacture.

Having thus described my invention, what I claim is:

1. The herein described method of making an axle housing which consists in taking a tube of the required length and cutting away substantially one-half of a middle section thereof, bending the remaining portion of said section away from the axis of the tube to form a part of the enlarged center of the housing and then securing to the thus partially formed housing a formed section complementary to said bent portion.

2. The herein described method of making an axle housing which consists in taking a tube of the required length and cutting away substantially one-half of a middle section thereof, bending the remaining portion of said section away from the axis of the tube, but in the plane thereof to form a part of the enlarged center of the housing and then welding in abutting relation to the edges of said remaining portion of said section a formed section complementary to said bent portion.

3. The herein described method of making an axle housing which consists in taking a tube of the required length and cutting away a substantial portion of a middle section thereof and thereby leaving an opening in said middle section having longitudinal edges extending in the direction of the axis of the tube and ends at substantially right angles thereto, bending the remaining portion of said section away from the axis of the tube to form a part of the enlarged center of the housing and then welding in abutting relation to some of said edges a formed section complementary to said bent portion.

4. The herein described method of making an axle housing which consists in taking a circular tube of the required length and cutting away from the middle thereof a section of substantially semi-circular cross section, bending the remaining semi-circular portion away from the axis of the tube to form a part of the enlarged center of the housing and welding in place of said cut-away section a formed section complementary to the said bent portion.

5. As a new article of manufacture, an axle housing having an enlarged center and tubular ends, said ends and one side of said enlarged center being integral and the opposite side of said enlarged center being an arched piece that is welded in position.

6. As a new article of manufacture, an axle housing having an enlarged center and tubular ends, said ends and the lower side of said enlarged center being integral and the upper side of said enlarged center being an arched piece that is welded in position.

7. As a new article of manufacture, an axle housing having an enlarged center and tubular end portions the inner ends of which are in planes normal to the axis of the tube and have welded in abutting relation thereto a piece of metal forming substantially the upper half of the enlarged center of the housing, the lower half of said enlarged center being integral with said tubular end portions.

8. As a new article of manufacture, an axle housing formed from a length of seamless tubing, the middle portion of said length of tubing constituting the lower half of the enlarged center of the housing and the upper half thereof consisting of an inserted piece which is welded in place.

9. As a new article of manufacture, an axle housing formed from a length of seamless tubing having substantially one-half of a middle section thereof cut away, and the remainder of said middle section being bent away from the axis of the tube and having opposed thereto a complementary piece, said piece and said bent portion forming the enlarged center of the housing and the spacing therebetween providing front and rear openings in said enlarged center.

In testimony whereof I affix my signature.

VIGGO V. TORBENSEN.